United States Patent
Domit

(10) Patent No.: US 8,960,495 B2
(45) Date of Patent: Feb. 24, 2015

(54) SODA STRAW DISPENSER

(76) Inventor: Antonio Domit, Mexico (MX)

(*) Notice: Subject to any disclaimer, the term of this patent is extended or adjusted under 35 U.S.C. 154(b) by 253 days.

(21) Appl. No.: 13/481,072

(22) Filed: May 25, 2012

(65) Prior Publication Data

US 2012/0298683 A1 Nov. 29, 2012

Related U.S. Application Data

(60) Provisional application No. 61/519,563, filed on May 25, 2011, provisional application No. 61/628,929, filed on Nov. 9, 2011.

(51) Int. Cl.
*B65G 59/00* (2006.01)
*B65H 3/00* (2006.01)
*G07F 11/00* (2006.01)

(52) U.S. Cl.
USPC ............ 221/255; 221/196; 221/265; 221/13; 221/103; 221/204

(58) Field of Classification Search
CPC ... G07F 11/045; G07F 17/0092; G07F 11/62; G07F 11/44; G07F 9/026; G07F 17/32; B65D 83/0409; A47F 1/10; A47F 1/126
USPC .............................. 221/196, 255, 265, 13, 103
See application file for complete search history.

(56) References Cited

U.S. PATENT DOCUMENTS

| | | | | |
|---|---|---|---|---|
| 1,507,999 A | * | 9/1924 | Hubbard | 194/250 |
| 1,602,358 A | * | 10/1926 | Getskay | 221/264 |
| 1,607,014 A | * | 11/1926 | Moak | 221/204 |
| 1,985,585 A | * | 12/1934 | Stone | 221/124 |
| 2,039,282 A | * | 5/1936 | Burke | 221/197 |
| 2,561,696 A | * | 7/1951 | Hammer | 222/449 |
| 2,683,554 A | * | 7/1954 | Mulhauser, Jr. | 221/152 |
| 3,472,421 A | * | 10/1969 | Baller | 221/196 |
| 3,556,344 A | * | 1/1971 | Lane et al. | 221/234 |
| 3,743,135 A | * | 7/1973 | Brumley | 221/205 |
| 3,841,531 A | | 10/1974 | Merila | |
| 4,219,130 A | * | 8/1980 | Wenkman et al. | 221/202 |
| 4,308,974 A | * | 1/1982 | Jones | 221/196 |
| 4,381,845 A | * | 5/1983 | Feis | 221/185 |
| 4,489,854 A | * | 12/1984 | Wenkman et al. | 221/202 |
| 4,619,376 A | * | 10/1986 | Huss | 221/243 |
| 4,789,081 A | * | 12/1988 | Mobbs | 221/281 |

(Continued)

FOREIGN PATENT DOCUMENTS

| | | |
|---|---|---|
| DE | 4344574 | 4/1996 |
| GB | 508427 | 6/1939 |
| WO | WO/2007/030867 | 3/2007 |

*Primary Examiner* — Rakesh Kumar
(74) *Attorney, Agent, or Firm* — Roger N. Chauza, PC

(57) ABSTRACT

A straw dispenser that hold two individual straws, sequentially selected from an inventory of straws. The upper straw is staged in a position to fall, and the lower straw is in a position made available to a person. The person grasps the available straw and pulls the same, which moves a lower movable part of the dispenser. The forward movement of the lower movable part allows the upper staged straw to fall downwardly to a transitory position, and during backward movement of the lower movable part the straw moves from the transitory position and is made available. At the same time a successive straw is selected from the inventory and held in the staged position. The person need not touch any other part of the dispenser or touch other straws to be dispensed. A subsequent straw cannot be dispensed until the available straw has been removed from the dispenser.

20 Claims, 18 Drawing Sheets

(56) References Cited

U.S. PATENT DOCUMENTS

| | | | |
|---|---|---|---|
| 4,830,375 A * | 5/1989 | Fleming | 273/148 R |
| 4,860,922 A * | 8/1989 | Malservisi et al. | 221/6 |
| 4,964,546 A * | 10/1990 | Morrow et al. | 222/352 |
| D329,465 S | 9/1992 | Kastanek | |
| D342,647 S | 12/1993 | Kastanek | |
| 5,381,925 A * | 1/1995 | Cervantes et al. | 221/184 |
| 5,657,901 A * | 8/1997 | Farside | 221/152 |
| 5,855,300 A * | 1/1999 | Malki | 222/153.09 |
| 5,960,988 A | 10/1999 | Freixas | |
| 6,131,765 A * | 10/2000 | Barry et al. | 221/264 |
| 6,189,731 B1 * | 2/2001 | Schmitt | 221/103 |
| 6,929,158 B2 * | 8/2005 | Smiley | 222/366 |

* cited by examiner

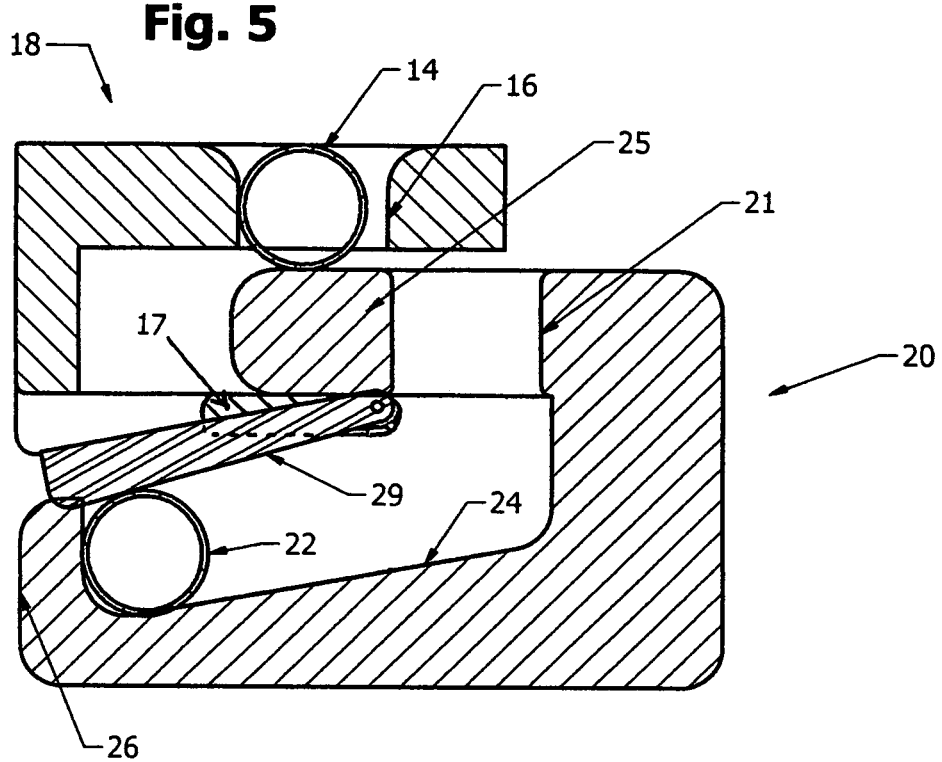
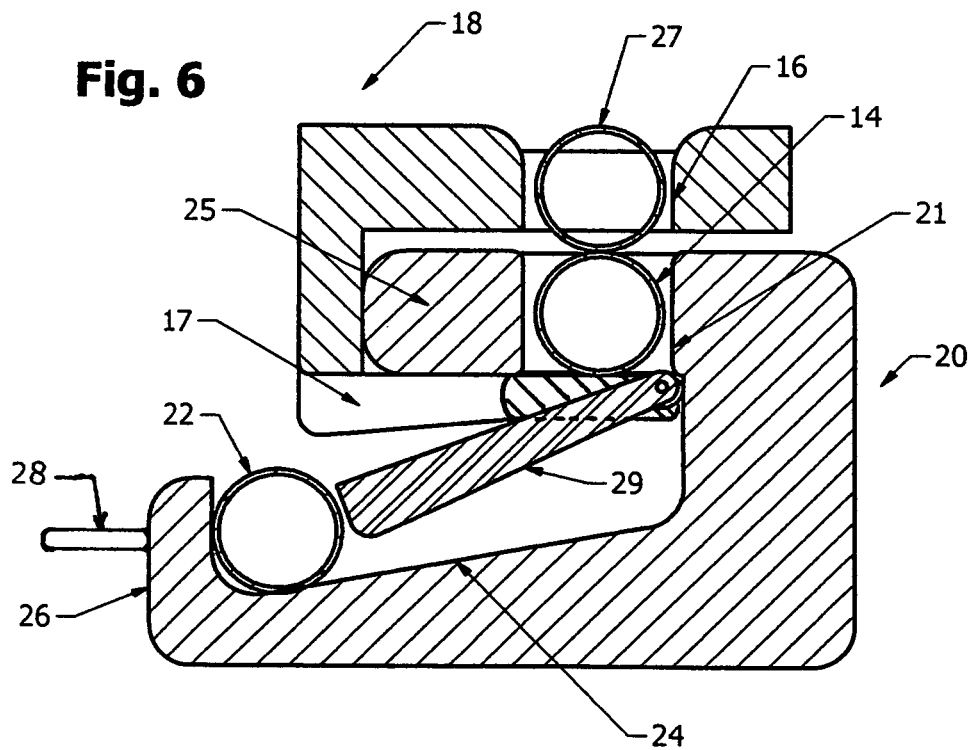

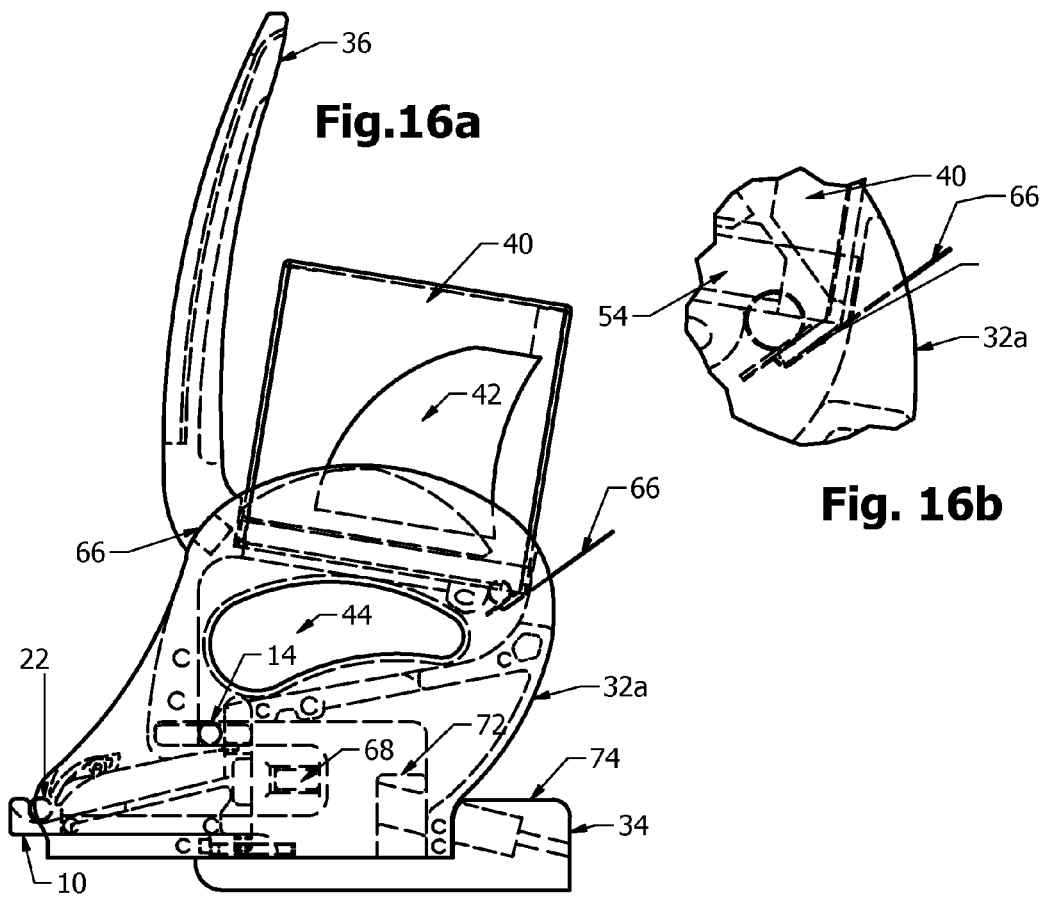
Fig.16a
Fig. 16b
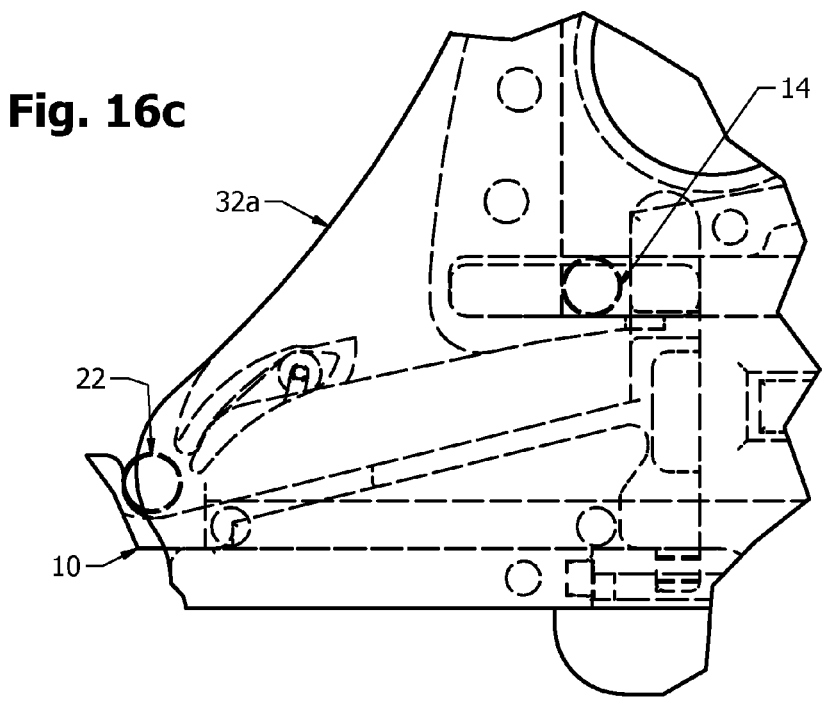
Fig. 16c

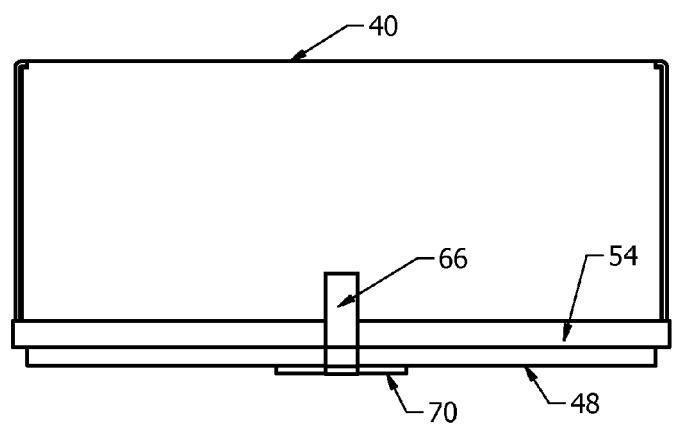
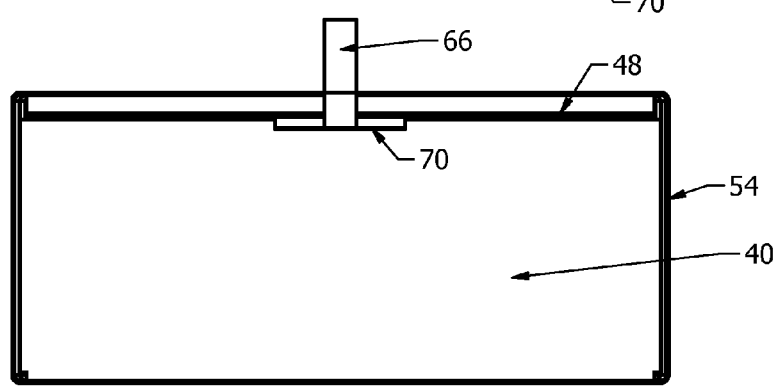
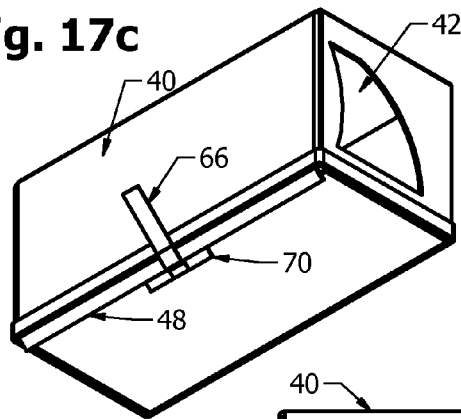
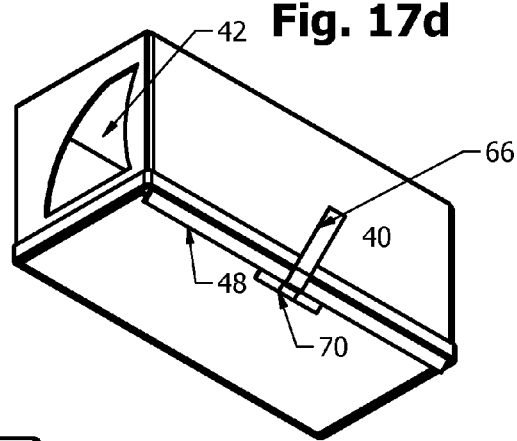
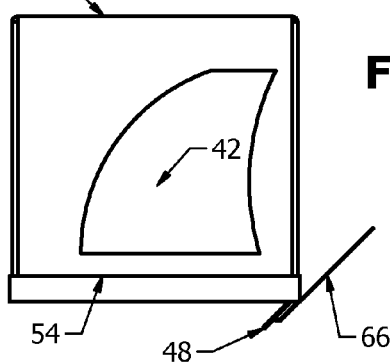
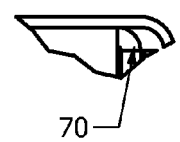

SODA STRAW DISPENSER

RELATED APPLICATIONS

This non-provisional patent application claims the benefit of provisional application Ser. No. 61/519,563, filed: May 25, 2011; and claims the benefit of provisional application Ser. No. 61/628,929, filed Nov. 9, 2011.

TECHNICAL FIELD

The present invention relates in general to soda straw dispensers, and more particularly to soda straw dispensers that allow a straw to be dispensed without touching the dispenser or other straws during the dispensing operation.

BACKGROUND OF THE INVENTION

Bacteria, viruses and other germs can be passed from one individual to another by direct contact between the individuals. Moreover, germs can be passed between individuals by contact with an intermediate object touched by both persons. A prime location for the transfer of germs is restaurants, food delivery shops, fast food franchises, etc., as many persons are in contact with the food items, utensils and the like from initial food preparation to the consumption of the food. This is exacerbated by persons frequenting restrooms in food preparation businesses, where both the employees and the customers can pick up germs and thereafter transfer the same to the food, food item dispensers, utensils, and the like.

An item that many individuals contact in food preparation businesses are soda straw dispensers. When using a straw dispenser, the straws are generally not covered with a protective and disposable sleeve, but rather are simply bulk straws as manufactured. In typical soda straw dispensers, plastic straws are stored in a metal container and dispensed one by one when the individual touches the mechanism that causes the straw to be dispensed. This may be a lever, a knob or other member which, when activated, causes a straw to be retrieved from the inventory of straws stored in the dispenser, and delivered to the user. Because every person who wants a straw must touch the dispensing mechanism, such mechanism becomes the object for transfer of germs from one individual to many others. Another way in which germs are transferred is when the straw dispenser is filled with straws. Since the employee touches the straws when refilling the dispenser, any germs that are carried by the employee can be transferred to the straws, and thus to all the persons dispensing the straws. What is needed is a soda straw dispenser that includes a straw container attachable to a straw dispenser so that when the straw container is out of straws, an entirely new container filled with straws can be attached to the reusable straw dispenser. With this arrangement, the employee does not have to touch any of the straws, but only the container having the straws therein as it comes from the manufacturer. Another way for a person to become contaminated would be when the employee places the individual straws in the dispenser container. If a container of straws is mounted to a reusable dispenser of the invention, the straws will need to come in a proper packaging to avoid contact with the employee.

The prior art includes numerous types of soda straw dispensers, and many of them have parts that must be manipulated by users, whereupon germs can be distributed amongst the users. Other dispensers allow the users to select the straws without touching the dispenser parts, but it is possible to touch more than one straw at a time, again allowing germs to be spread from one user to a subsequent user. Yet other dispensers allow more than one straw to be dispensed at a time, thus wasting straws. Examples of the prior art dispensers include U.S. Pat. Nos. 3,556,344; 3,841,531; 4,789,081; 5,381,925; D329,465 and D342,647.

From the foregoing, there is a need for a straw dispenser which can be manipulated by a user by just touching the straw to be dispensed, without touching any other mechanism of the straw dispenser. Another need exists for a straw dispenser that accurately dispenses only one straw at a time, and presents the straw to the user on a one-at-a time basis.

SUMMARY OF THE INVENTION

In accordance with the principles and concepts of the invention, disclosed is a soda straw dispenser that selects a straw from the inventory of straws, stages the straw for dispensing while another straw is presently available for dispensing by a user. Once the available straw is dispensed by a user, the staged straw moves through a transitory position and is then made available to be dispensed, and so on until the inventory of straws is exhausted. A subsequent straw cannot be dispensed until the available straw has been removed from the soda straw dispenser.

The straw made available to the user by the dispenser allows a portion of the straw to be grasped by the user and pulled, thereby pulling a movable part of the dispenser forwardly, which movement allows the staged straw to drop to the transitory position. When the movable part of the dispenser returns to a home position, the straw drops from the transitory position into the bottom of the dispenser where it is available to the same or a different user. The only part that is required to be touched by a user is the exposed portion of the straw made available by the dispenser. The dispenser of the invention thus reduces the instances of the spread of germs, and the like, as no part of the dispenser need be touched by the user thereof.

The straw dispenser of the invention is structured to select a first straw from the inventory and hold it in the staged position, temporarily hold a second straw in the transitory position, and hold a third straw at the bottom of the dispenser and be made available to the user. The bottom part of the straw dispenser includes a slanted landing so that when a straw is dropped from the transitory position, it falls onto the slanted landing and rolls forwardly. The only straw that the user can touch is the straw that is available on the slanted landing.

According to another feature of the invention, the straw dispenser can be utilized with a box of straws which forms the inventory of straws. The box of straws is structured so that a person loading the dispenser need not touch or otherwise manipulate any of the straws. Rather, the box of straws can be fastened to the dispenser without touching any of the straws, and then opened so that the straws can fall into the soda straw dispenser. As such, this combination of components facilitates the dispensing of a large number of straws from a number of boxes without any manipulation of the individual straws during restoration of the inventory of straws.

With regard to yet another feature of the invention, the straw dispenser can be equipped with an advertisement attachment to provide advertising media to potential users of the straw dispenser. Indeed, the advertisement media placed in the attachment is in direct view of a user of the straw dispenser, thereby effectively forcing the user to look at the advertisement.

According to one embodiment of the invention, disclosed is a straw dispenser mechanism that includes a top staging part and a lower slideable dispensing part. The top staging part has an elongated slot therein, and has a lateral stop member spaced from and underlying the elongated slot. The lower slideable dispensing part also has an elongate slot therein, where one portion of the elongate slot of the lower slideable dispensing part defines a lateral separator member. A spring biases the lower slideable dispensing part to a home position in which the lateral separator member of the lower slideable dispensing part holds the straw in a transitory position and prevents the straw in the slot of the top staging part from falling downwardly. The lower slideable dispensing part has an opening in which at least a portion of a straw to be dispensed is made available to a user for grasping, and when the straw is grasped and pulled, the lower slideable dispensing part moves forwardly to allow the straw to be taken by the user, whereupon another straw is loaded from an inventory of straws into the straw dispenser mechanism.

According to yet another embodiment of the invention, disclosed is a straw dispenser mechanism which includes a stationary part having an elongated slot and an elongate stop spaced from and underlying the slot. Also included is a movable part of the mechanism that is movable from a home position forwardly to a dispensing position. The movable part has an upper member that is movable between the elongated slot and the elongate stop of the stationary part, and the upper member of the movable part has an elongate slot and an elongate stop structured so that when the movable part is in the home position, the elongated slot of the stationary part and the elongate stop of the movable part are vertically aligned so that a straw is in a staged position in the elongated slot of the stationary part and rests on the elongate stop of the movable part.

According to a further embodiment of the invention, disclosed is a method of dispensing straws, which includes storing a supply of straws above a straw dispenser, and holding a straw in a temporary position as an individual straw. The method further includes dropping the straw onto a slanted member during dispensing of a straw, and exposing the portion of the available straw to the user so that the straw can be pulled and retrieved by the user. The pulling causes the available straw to move a slideable dispenser part and allow the straw to be removed by the user from the dispenser. When the straw is removed from the slideable dispenser part, the slideable dispenser part is retracted to a home position to allow a subsequent straw to drop down onto the slanted member and roll forward so that a portion thereof is exposed and available to another user. With this arrangement, the straws can be dispensed by allowing users to touch only portions of the straws that are dispensed.

BRIEF DESCRIPTION OF THE DRAWINGS

FIG. 5 is a cross-sectional view of the straw dispenser mechanism showing the interengagement of the top stationary part, and the lower slideable part in a rest position.

FIG. 6 is a cross-sectional view of the straw dispenser mechanism showing the interengagement of the top stationary part, and the lower slideable part moved forwardly during dispensing of a straw.

FIGS. 16a-16c are side and partial views of the straw dispenser showing the straw box attached to the dispenser, the straw box door and the straw brake.

FIGS. 17a-17f are various views detailing the structural features of the straw box.

DETAILED DESCRIPTION

Figure 1:
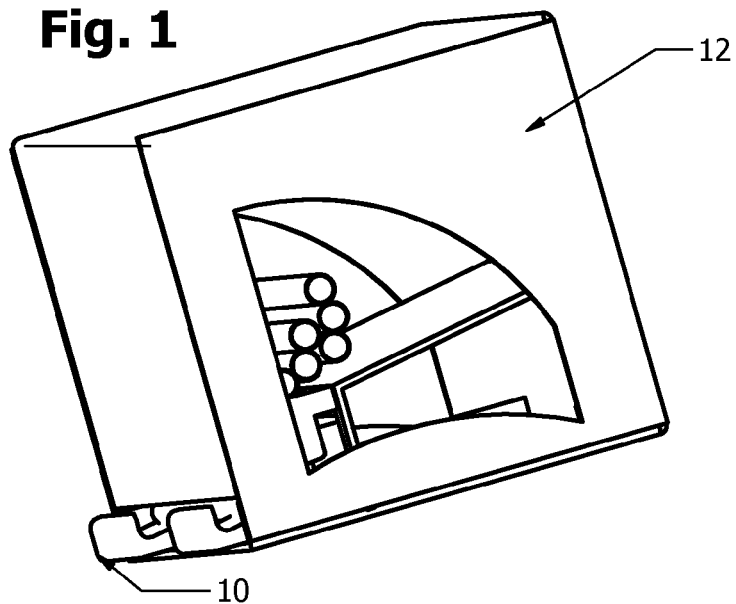
FIG. 1 is a an isometric view of a straw dispenser according to one embodiment of the invention.

The straw dispenser mechanism 10 shown in FIG. 1 can be constructed and made integral with a box 12 of straws to dispense straws directly from the box 12 without having to handle or touch any part of the dispenser container or multiple straws, other than the one being dispensed. The straws typically are ready to use, and do not come with a disposable paper sleeve covering the individual straws. The dispenser 10 can also be made with or attached to standard metal or stainless steel dispenser containers 12 typically found in fast food restaurants. As yet another alternative, the straw dispenser 10 can be made reusable so as to be attachable to a heavy paper or cardboard box 12 full of straws. Once the box 12 of straws is depleted, a new box full of straws can be attached to the reusable dispenser mechanism 10. The straw dispenser 10 itself can be constructed by injection molding a plastic material, such as ABS, or many other suitable materials. With the dispenser 10, a person can dispense a single straw without being able to touch any other straw.

Figure 2:
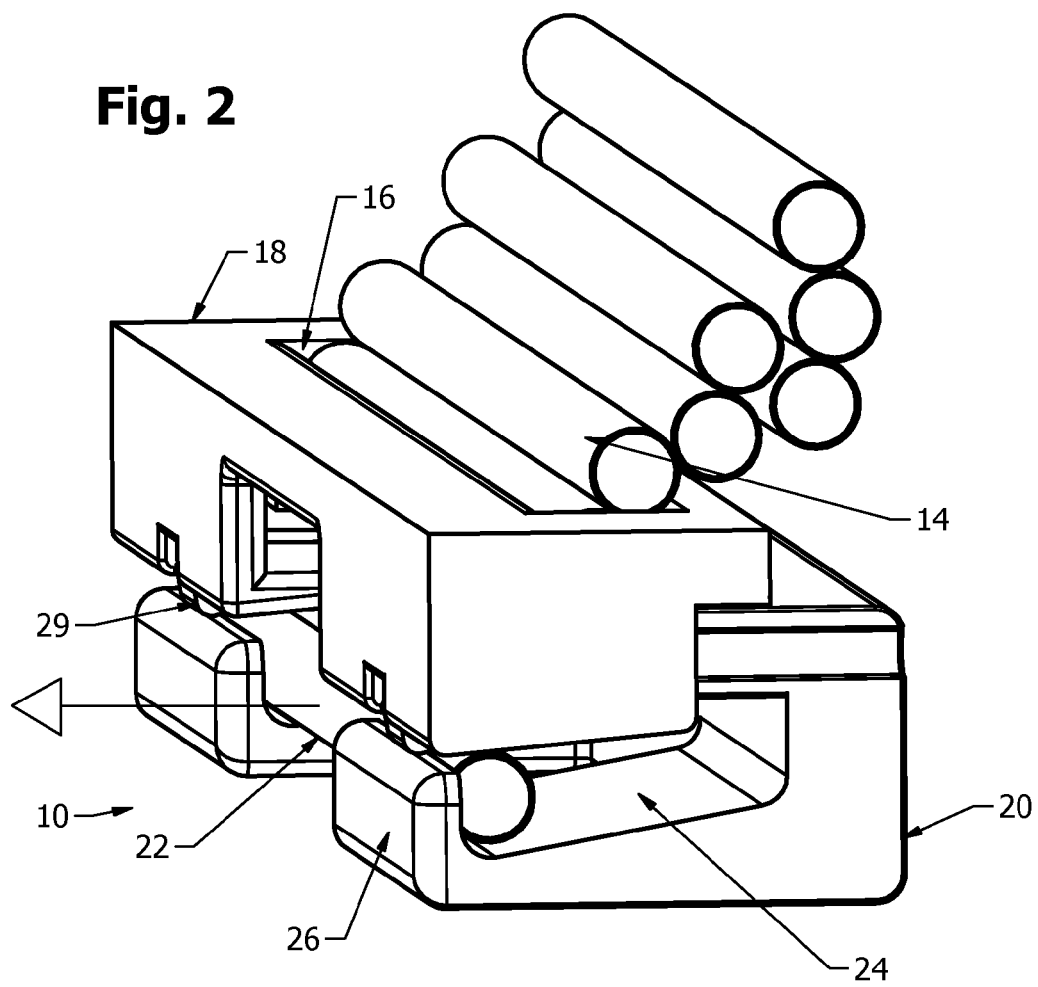
FIG. 2 is an isometric side view of the straw dispenser mechanism.
Figure 3:
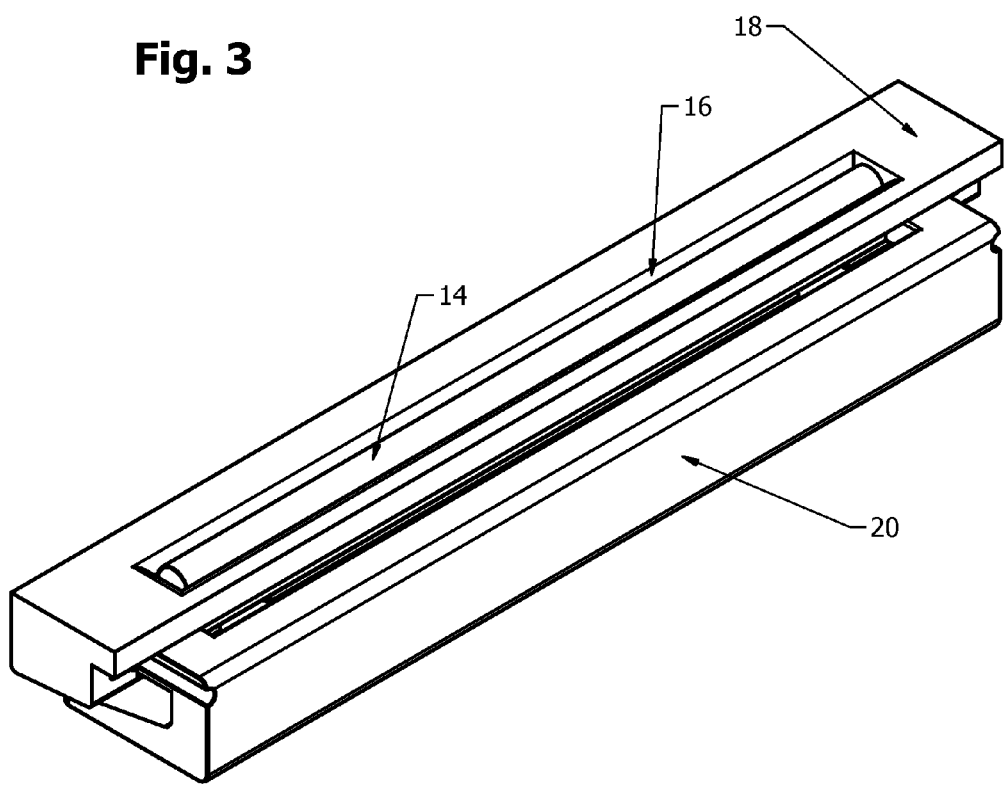
FIG. 3 is an isometric side and top view of the straw dispenser mechanism.

An enlarged end view of the dispenser 10 is shown in FIG. 2. A cross-sectional view of the straw dispenser 10 in a rest or home state is illustrated in FIG. 5, and in FIG. 6 with the lower slideable dispenser part 20 pulled outwardly for the dispensing of a straw 22. FIGS. 7-10 illustrate the details of the top stationary part 18 of the dispenser 10, and the lower slideable dispenser part 20 of the dispenser 10. A number of straws overlie the dispenser 10 in the dispenser container, whether it be a paper-type box or a metallic container. One straw 14 is ready to fall down through an elongated slot 16 (FIGS. 3 and 5) in the top stationary part 18 of the dispenser 10. However, a lateral separator member 25 (FIG. 10) of the lower slideable dispenser part 20 prevents the straw 14 from temporarily falling downwardly. The previous dispensing of a straw (not shown) has dispensed a new straw 22 onto the slanted landing 24 of the lower slideable dispenser part 20 (FIGS. 2, 5 and 6). The straw 22 is shown as it rolled down the slanted landing 24 and is stopped by the upturned end 26.

Figure 4:
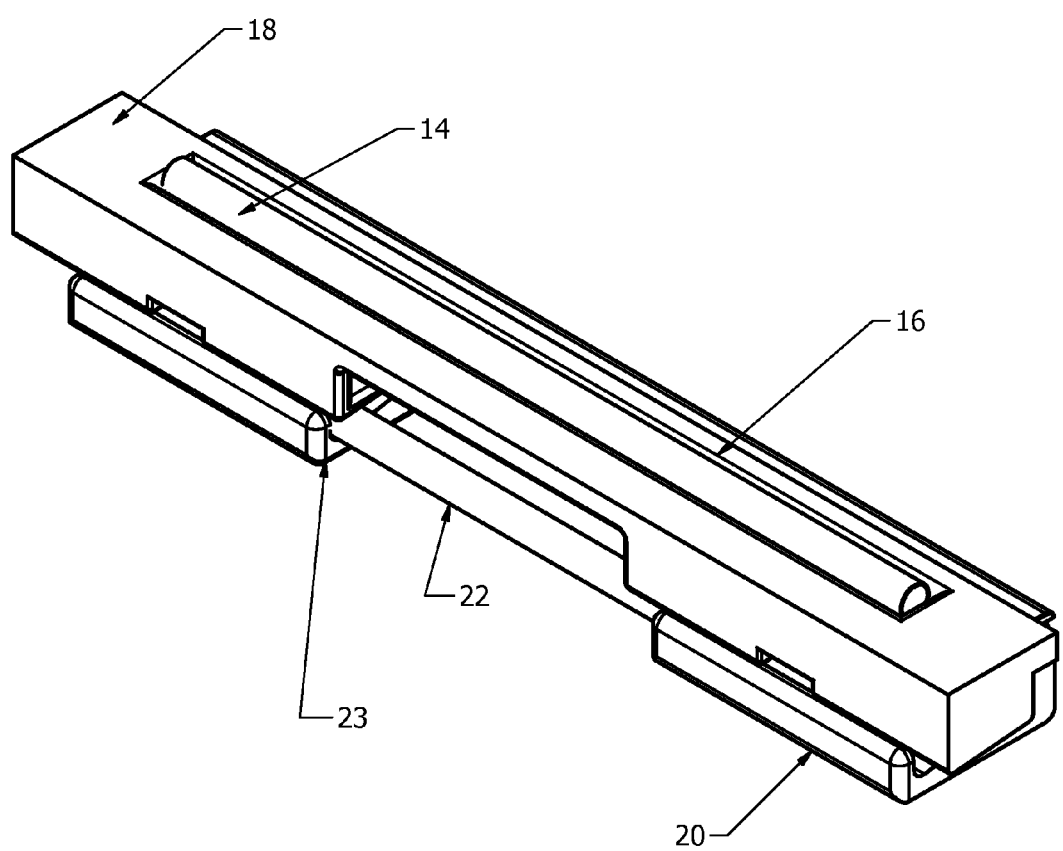
FIG. 4 is an isometric top view of the straw dispenser mechanism.

When a person desires to dispense the available straw 22, the person grasps the midsection of the straw 22 which is exposed in the lateral opening 23 of the lower slideable dispenser part 20, as shown in FIG. 4. The lower slideable dispenser part 20 is shown in the rest position in FIGS. 4 and 5. In FIG. 5, the upper straw 14 is shown in a staged position when the lower slideable dispenser part 20 is in the rest position. The person simply grasps and pulls on the exposed part of the available straw 22, which also pulls or slides the lower slideable dispenser part 20 (against light spring tension, not shown) towards the person. The person lifts the straw 22 from the lower slideable dispenser part 20. As noted in FIGS. 5 and 6, the upper part of the lower slideable dispenser part 20 slides in a channel of the stationary part 18 which comprises the space between the upper part in which the elongated slot 16 is formed and the bottom part which includes the lateral stop member 17.

As noted above, once the straw 22 has been dispensed by pulling on the midsection thereof, which pulls the lower slideable dispenser part 20 forwardly, the person removes the available straw 22. In this state of the straw dispenser 10 shown in FIG. 6, a leaf spring 28 retracts the lower slideable dispenser part 20 back to the rest or home position shown in FIGS. 2 and 5. When the lower slideable dispenser part 20 moves under spring force backwardly into the dispenser 10, the next available straw 14 is moved along the horizontal transitory path backwardly past the lateral stop member 17 of the upper stationary part 18 until the straw 14 falls down on the slanted landing 24. During the backward travel of the lower slideable dispenser part 20, the lateral separator member 25 (FIG. 10) slides under a new upper straw 27 (FIG. 6) and prevents it from falling downwardly and also being dispensed. It can be seen that when the dispenser 10 is not being operated by a user, it holds two individual straws 14 and 22, but during the time when the user operates the lower slideable dispenser part 20, the dispenser 10 momentarily holds three straws 14, 22 and 27.

The sequence of operations of the soda straw dispenser 10 is summarized below. a) When at rest, two straws are held in the dispenser 10, namely, one straw is held in the elongated slot 16 of the upper stationary part 18, and another straw is held on the slanted landing 24. b) When it is desired to dispense a straw, the user grasps the straw available 22 on the slanted landing 24 and pulls it forwardly, thereby moving the lower slideable part 20 forwardly also. c) During the forward movement of the lower slideable dispenser part 20, the straw 14 that was in the elongated slot 16 of the upper stationary part 18 falls into the slot 21 of the lower slideable dispenser part 20. d) As the straw 14 falls down into the slot 21 of the lower slideable dispenser part 20, a third straw 27 falls from the inventory or supply of straws into the now empty elongated slot 16 of the upper stationary part 18. e) Once the available straw 22 is removed from the slanted landing 24, the spring force returns the lower slideable dispenser part 20 to its home position. f) Lastly, during the backward movement of the lower slideable dispenser part 20, the straw 14 temporarily held in the slot 21 of the lower slideable dispenser part 20 falls onto the slanted landing 24, thereby making it next straw available. The dispenser 10 again is staged for another dispensing cycle, where a first straw is staged in the slot 16 of the upper stationary part 18, and a second straw is available for dispensing on the slanted landing 24. As will be described below, the dispenser 10 will not load a subsequent straw until the available straw has been removed from the dispenser 10 by the user.

Figure 14A:
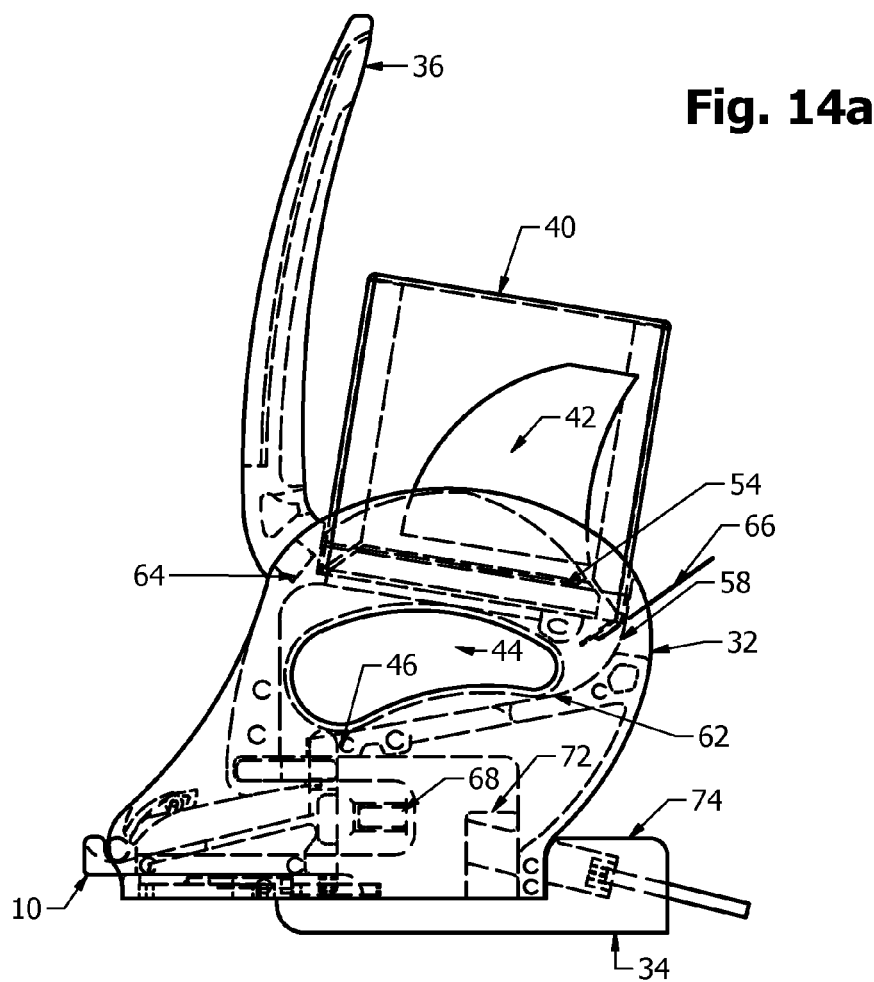
FIGS. 14a and 14b are side views showing the straw brakes.
Figure 14B:
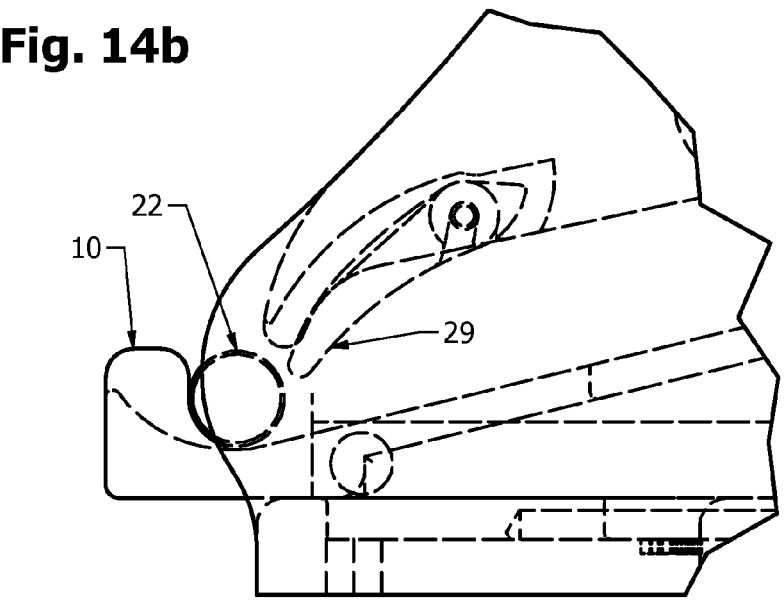

With regard to FIGS. 5, 6 and 14*b*, a pair of optional straw brakes are provided, one shown as numeral 29, for preventing the return of the lower slideable dispenser part 20 until the available straw 22 has been removed from the straw dispenser 10. This prevents a user from trying to accumulate straws on the slanted landing 24 by repeatedly operating the lower slideable dispenser part 20 without removing the available straw 22. The straw brake 29 is mounted for pivotal movement about an axle to the base 32 (not shown). Because of the design of the straw brake 29, the frontal pivotal end hangs down as shown in FIG. 6, just behind the available straw 22. If the user leaves the available straw 22 on the slanted landing 24 and tries to return the lower slideable dispenser part 20 backwards to the rest position, the straw brakes 29 block the backward movement of the available straw 22, and thus block the backward movement of the lower slideable dispenser part 20. The only way for the lower slideable dispenser part 20 to return to the rest position is for the user to remove the available straw 22, whereupon, the lower slideable dispenser part 20 can then move backwards under spring bias to the rest position.

Figure 11:
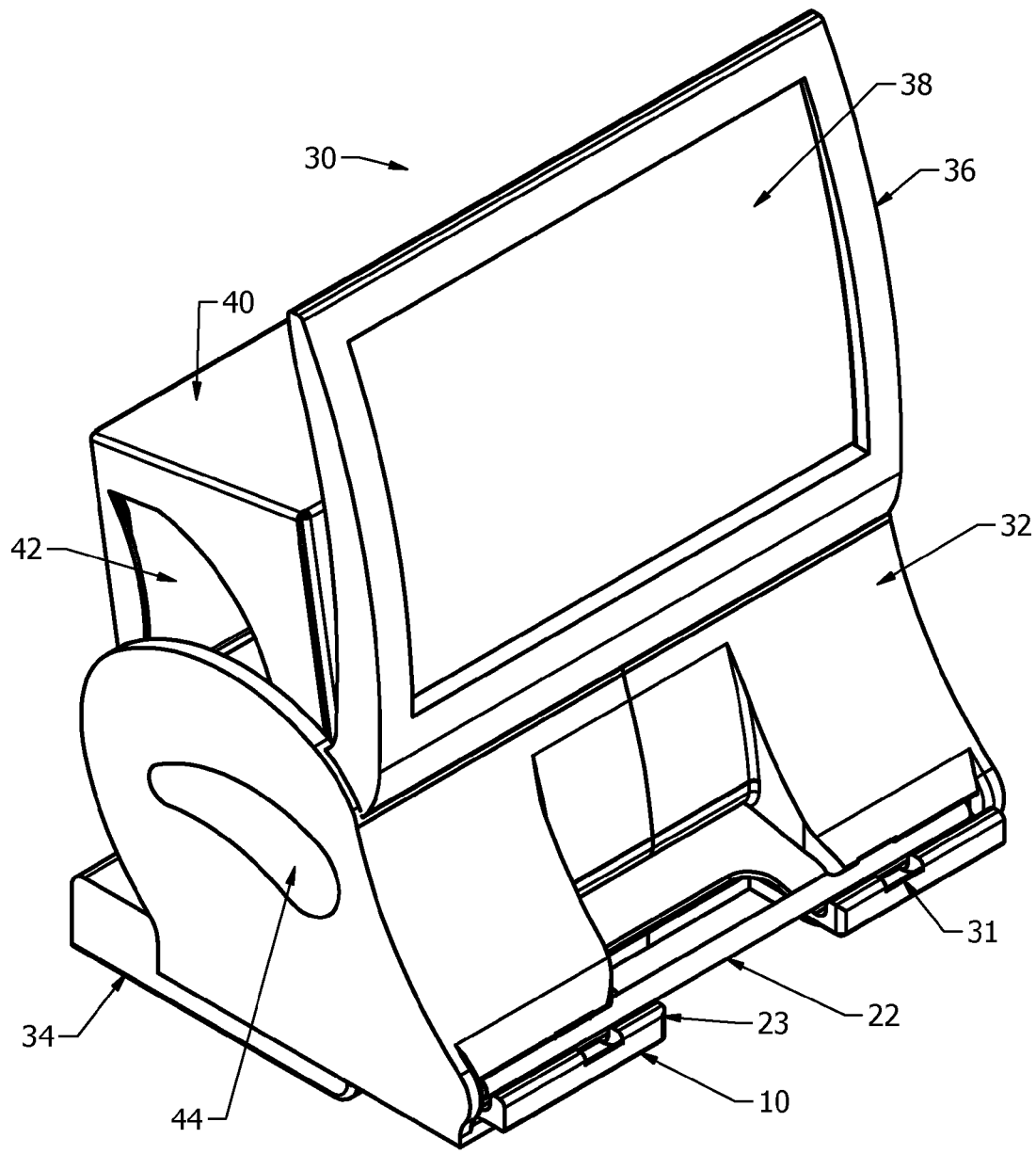
FIG. 11 is an isometric view of the straw dispenser mechanism with the straw selector/dispenser, base and box.

In order for the lower slideable dispenser part 20 to move past the straw brakes 29 during backward movement, the lower slideable dispenser part 20 is constructed with a pair of cutouts, one shown as numeral 31 (FIG. 11). The backward movement of the lower slideable dispenser part 20 is allowed as the cutouts 31 do not block backward movement of the frontal upturned part of the lower slideable dispenser part 20.

The straw dispenser 10 is adapted for use with a box 12 of straws, and when depleted of straws, the box 12 is replaceable with a full box of straws. The preferred embodiment of the construction of a box 40 of straws is described below in connection with FIGS. 17*a*-17*f*. Nevertheless, the dispenser 10 can be made with an integral plastic platform with three sides having upturned lips into which the bottom of the box 12 of straws is fitted. The fourth side of the platform comprises the straw dispenser 10 itself. One bottom corner of the box 12 is perforated so as to be removable so that the straws can be dispensed into the top of the straw dispenser 10. One or more bottom corners of the box of straws can be clamped to the platform by spring-loaded means attached to the platform, or the box 12 can be friction fit into the upturned lips of the platform. The box 12 can be installed to the straw dispenser 10 by removing the bottom perforated bottom of the box 12, turning it upside down, retracting the spring-loaded means of the dispenser 10 and attaching the straw dispenser 10 to the upturned box 12. The spring-loaded means is then released to capture the box 12 to the straw dispenser 10, and the unit is turned upside down and placed on a counter for use by customers. The straw box of FIGS. 17*a*-17*f* is constructed so that the straw dispenser 10 does not need to be turned upside down to install a new box of straws therein.

Figure 10:
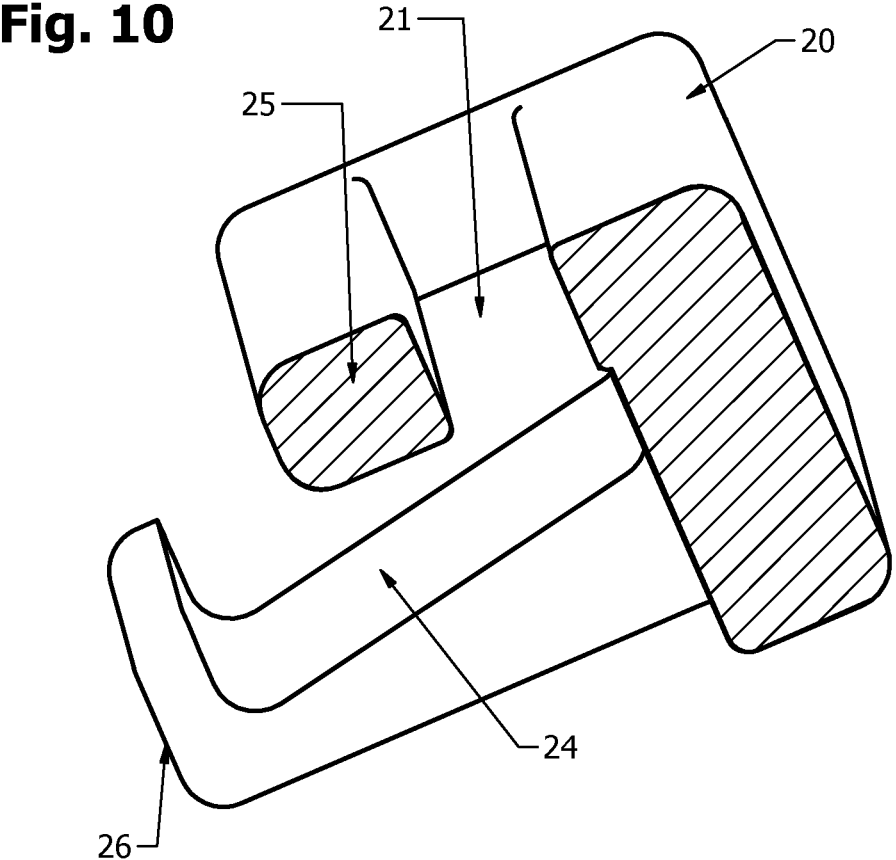
FIG. 10 is a cross-sectional view of the lower slideable part of the straw dispenser mechanism.

From the foregoing, illustrated in FIG. 2 and described is a new straw dispenser 10 having a top stationary part 18 and a lower slideable dispenser part 20. The top stationary part 18 is constructed with a lateral stop member 17 that prevents straws from falling down during forward movement of the lower slideable dispenser part 20 and dispensing of the previous straw. Similarly, the lower slideable dispenser part 20 (FIG. 4) includes a lateral separator member 25 that also functions to prevent straws from falling down from the elongated slot 16 of the top stationary part 18 (FIG. 9) when the lower slideable dispenser part 20 is in the home position. After dispensing a straw and when the lower slideable dispenser part 20 is retracted backwards by spring force, a straw captured in the slot 21 of the lower slideable dispenser part 20 falls onto the slanted landing 24 (FIG. 10). At the same time, a new straw is loaded in the elongated slot 16 of the upper stationary part 18.

With the new straw dispenser 10 a person does not need to touch any part of the dispenser except the midsection of the straw itself. Because of the construction of the straw dispenser 10, the straws are loaded and dispensed in an orderly manner and thus sticking of the straws and malfunction of the dispenser is overcome.

Figure 13:
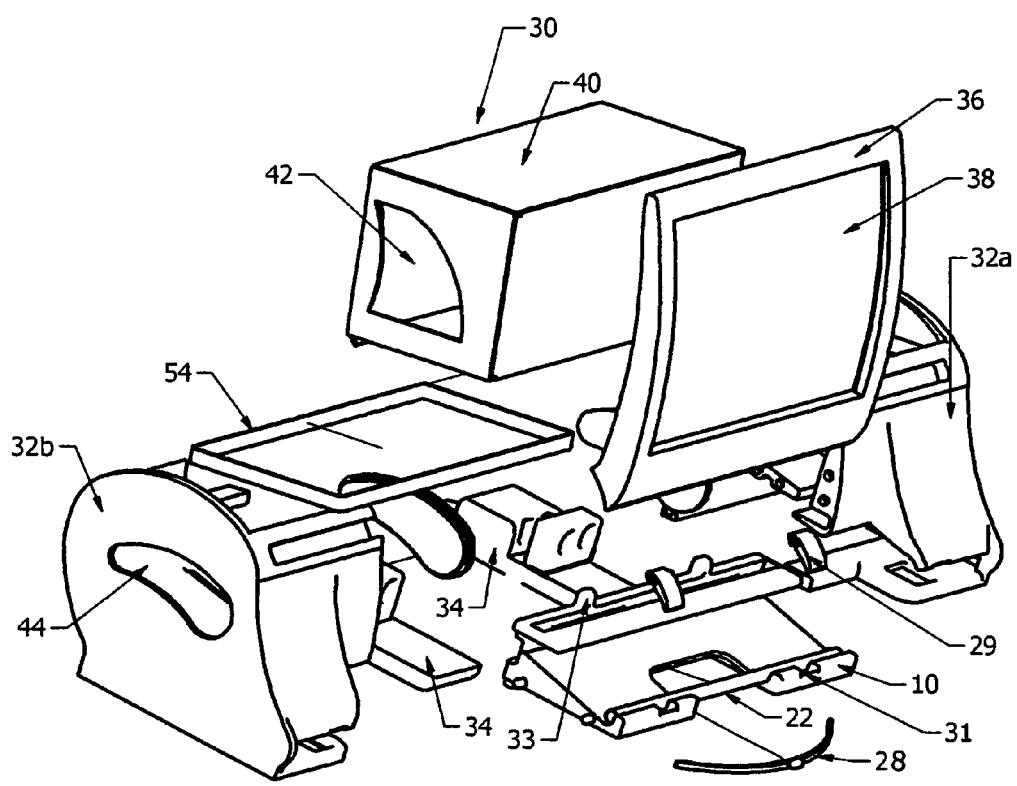
FIG. 13 is an exploded view of the straw dispenser mechanism of FIG. 11.

According to another feature of the straw dispenser 10, the forward movement of the lower slideable dispenser part 20 during dispensing of an available straw 22, moves straws in the base compartment 58 toward the elongated slot 16 in the upper stationary part 18. The lower slideable dispenser part 20 is constructed with a pair of upwardly extending tabs, one shown as numeral 33. This is shown in FIG. 13. The tabs 33 extend through elongate slots (not shown) formed in the slanted floor 62 (FIG. 15) of the base compartment 58, and engage loose straws on the slanted floor 62. As the lower slideable dispenser part 20 is moved forwardly during dispensing of a straw 22, the tabs 33 move forwardly to move straws forwardly toward the elongated slot 16 formed in the upper stationary part 18. As such, the straws stored in the base compartment 58 are moved forwardly and the tendency of the straws to hang up in the base compartment is reduced.

Figure 12:
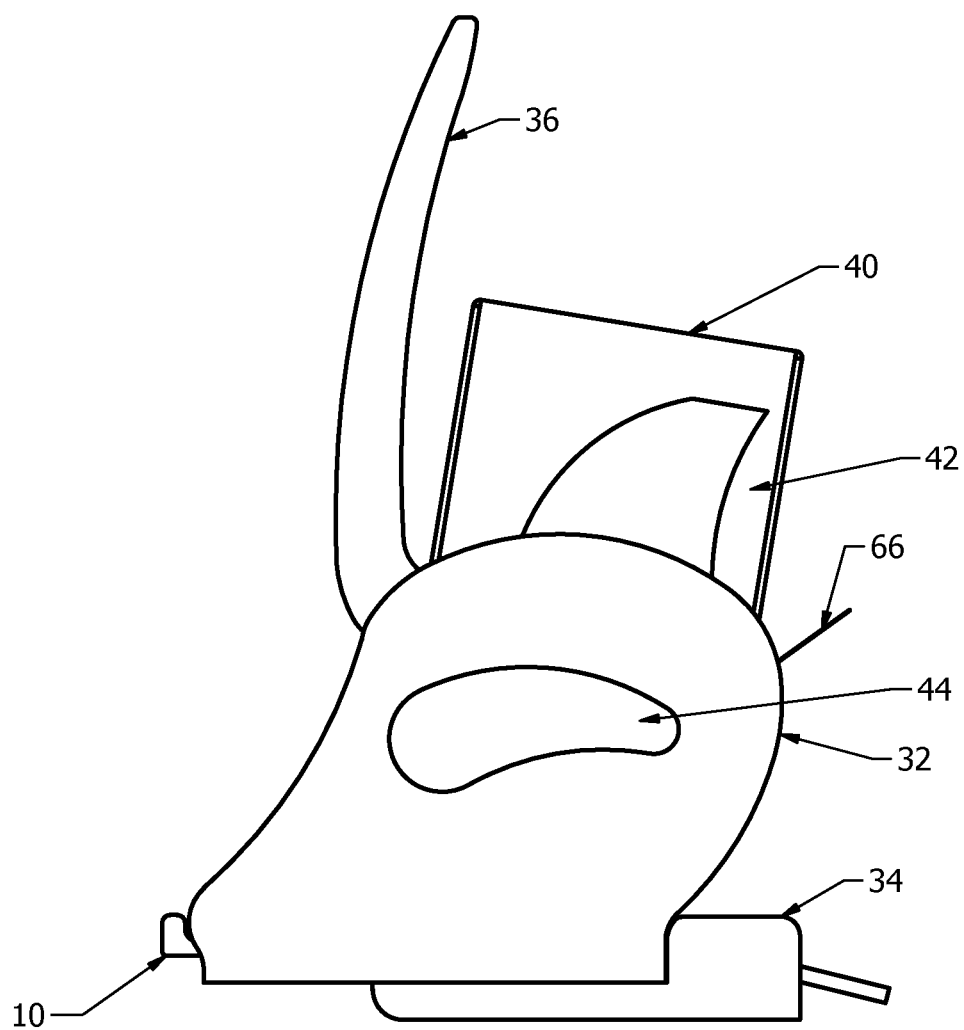
FIG. 12 is a side view of the straw dispenser mechanism of FIG. 11.

FIGS. 11 and 12 illustrate an embodiment of a straw dispenser 30 equipped with a base 32 to which a wall stand 34 can be attached. The wall stand a 34 is constructed so as to be removably attached to the base 32, and attached to a vertical wall or the like, for fastening the straw dispenser 30 thereto. The details of the wall stand 34 are described below in connection with FIGS. 20a-20c. The straw dispenser or selector 10 is removably fastened to the bottom portion of the base 32. An advertisement display 36 is removably attached to the base 32. The advertisement display 36 includes a window 38 through which one can view a paper or plastic advertisement sheet that is inserted between two opposed channels formed on the backside of the advertisement display 36. A straw box 40 is insertable into a rectangular-shaped opening in the top of the base 32 and held therein so that straws in the box 40 can drop down into the base compartment 58. The straw box 40 has side windows 42 of clear plastic films to enable a person to see how many straws remain in the box 40. The base compartment 58 also includes one or two side windows 44 of a clear plastic for allowing a user to see how many straws remain in the base 32. All of the components of the dispenser 30 can be constructed of a moldable ABS type of plastic.

FIG. 13 is an exploded view of the straw dispenser 30. The base 32 can be constructed in two halves 32a and 32b and then bonded together during assembly. One base half 32a is constructed with pins and the other base half 32b is constructed with holes into which the pins fit. The base 32 includes an upper opening thorough which the straws fall from the box 40 into a base compartment 58. The box 40 of straws includes a band 54 around the bottom portion thereof, for fitting into a box receptacle 56 of the top of the base 32. The wall stand 34 is constructed with a notch into which a back panel of the base 32 fits to thereby register and removably attach the straw dispenser 30 to the wall stand 34. Illustrated is the bowed leaf spring 28 that functions to return the lower slideable dispenser part 20 to the rest position after a straw has been dispensed by a user. The midsection of the leaf spring 28 is fastened to the base member 32, and the free ends of the leaf spring 28 engage with the lower slideable dispenser part 20 to push it backwardly.

Figure 15:
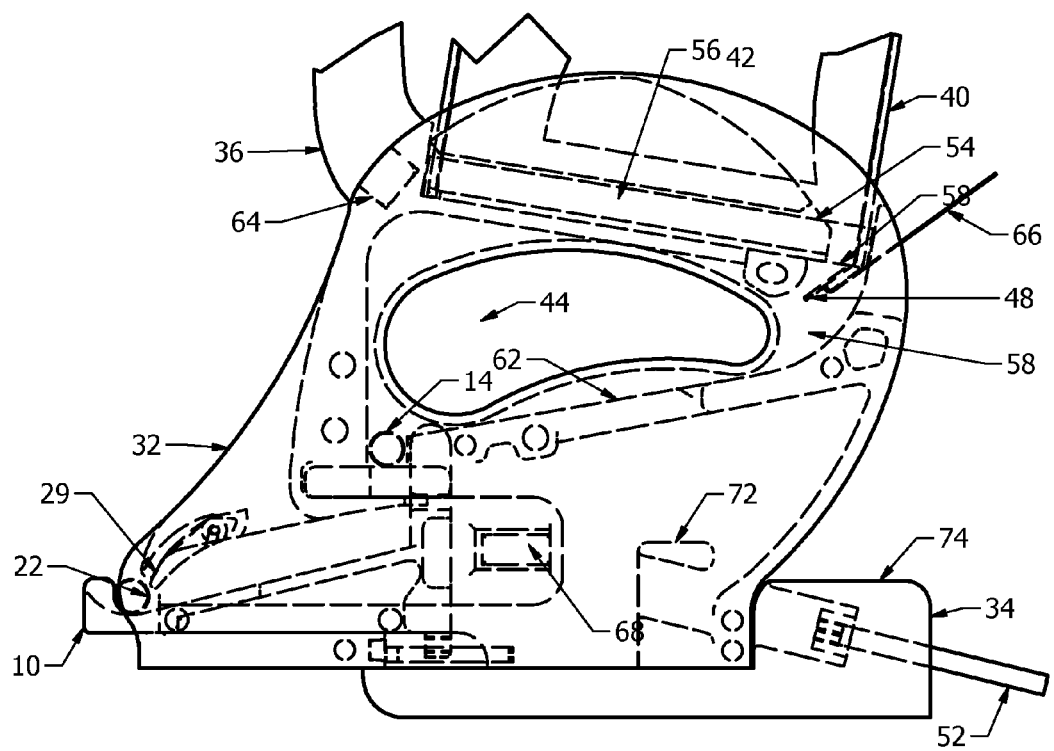
FIG. 15 is a side view of the straw dispenser illustrating various details.

FIGS. 14, 15 and 16 illustrate further details of the straw dispenser 30. The straw box 40 is constructed with a band 54 along the bottom perimeter. The band 54 makes the straw box 40 somewhat larger in circumference so that it fits within a box receptacle 56 formed in the top of the base 32. Once the straw box 40 is installed in the base 32, and opened, the straws can fall out of the box 40, through the top opening 60 and into the base compartment 58. As will be described below, an elongate door 48 is hinged to the straw box 40 so that when opened the straws fall into the base compartment 58. The base compartment 58 includes a downwardly slanted floor 62 so that the straws migrate via gravity to the bottom front thereof and are available to the dispenser/selector 10.

The base 32 of the straw dispenser 30 rests on the wall stand 34. As will be described below with FIGS. 20a-20c, each wall stand 34 is formed with two upright members 72 and 74 having a space or notch 51 therebetween. This is shown in FIG. 15. The back panel of the base 32 has a bottom edge that frictionally fits within the notch 51 of the wall stand 34. Various mechanisms can be used to lock the base 32 within the wall stand 34. The platform 50 of the wall stand 34 is sufficiently long as to support a majority of the bottom of the base 32 of the straw dispenser 30 thereon, as shown in FIG. 15. With two wall stands 34, the straw dispenser 30 can rest in a stable manner on the wall stands 34 and cannot be inadvertently pulled off. FIG. 15 also illustrates a pull strip 66 attached to a door 48 that is hinged to the straw box 40. Both the straw box 40 and the door 48 can be constructed of a paper material, and hinged together in a typical manner. Once the straw box 40 is installed into the dispenser 30, the pull strip 66 is available to a person to pull thereon to open the door 48 and allow the straws to fall out of the box 40 and into the compartment 58 of the dispenser base 32.

The advertisement display 36 is removably attached to the dispenser base 32 by tangs 64 that are inserted within slots formed in the base 32. The straw selector 10 is installed from a bottom frontal opening in the base 32, and pushed backwardly and upwardly until engaged by the bottom of the slanted floor 62. The dispenser/selector 10 is then held in place by a pair of latches 68 are located on each inside surface of the base 32 to latch the lower slideable dispenser part 20 into place. The latches 68 can be manually released by access through a large opening in the bottom of the base 32.

The details of the straw box 40 are shown in FIGS. 17a-17f. The straw box 40 is constructed with a clear plastic window 42 on both ends thereof, but is otherwise constructed of a paper, cardboard, plastic or other inexpensive material. The strap 54 can be constructed of a thin strip of plastic, paper or other material that is adhered around the bottom perimeter of the box 40. The straw box 40 can be further constructed with a hinged door 48 that extends along a corner of the box 40. Attached to the midsection of the door 48 is a flap 70 that is connected to the pull strip 66. The flap 70 is normally inside the box and engages with the bottom inside surface of the box 40 so that the door 48 remains closed. The box 48 can then be transported or shipped without the straws dropping out of the box 40. When it is desired to replace a spent box, a new box 40 full of straws can be installed into the dispenser 30 so that the pull strip 66 is accessible from the back of the base 32. A person then pulls on the pull strip 66, whereupon the flap 70 is forced out of engagement with the bottom inside surface of the box 40 to allow the door 48 to be pulled opened. The straws can thus fall out of the straw box 40 into the compartment 58 of the base 32. A short length of tape can be attached to the end of the pull strip 66 to tape it to the box so that it is not inadvertently pulled during handling. When the box 40 is to be opened, the tape can be removed so that the pull strip 66 can be grasped and pulled.

Figure 18A:
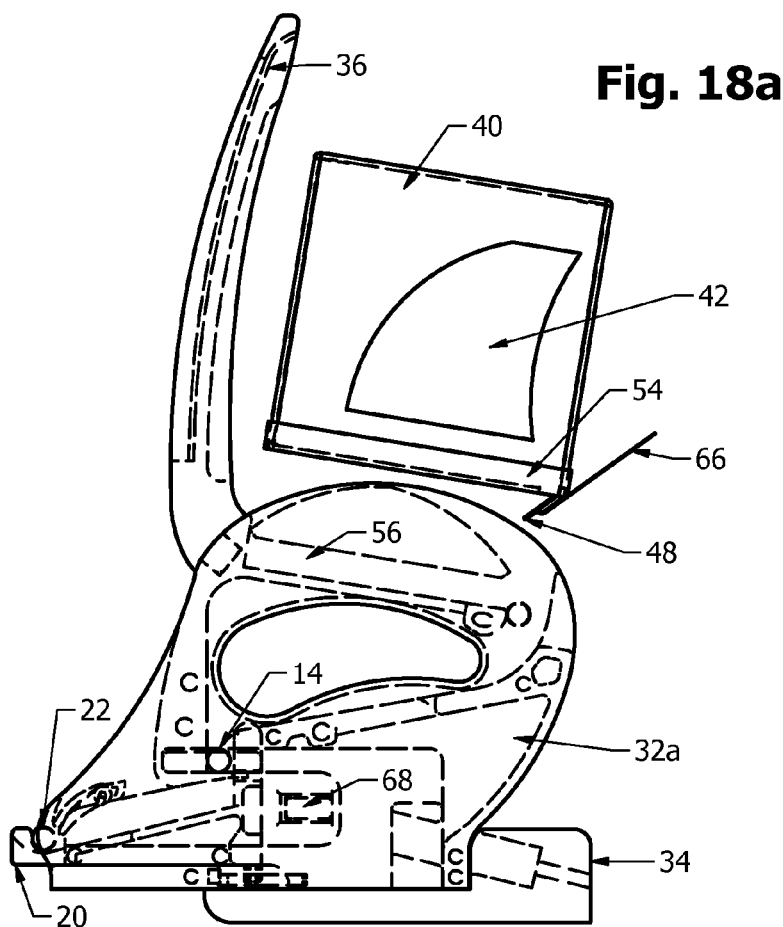
FIG. 18a is a side view of the straw dispenser mechanism showing engagement with the straw box.
Figure 18B:
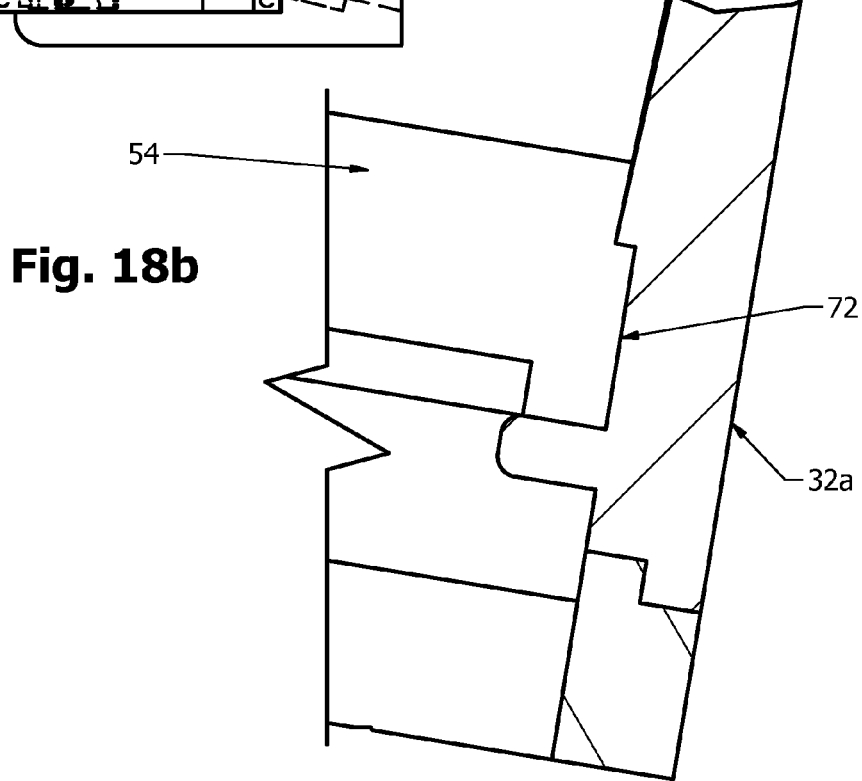
FIG. 18b illustrates an enlarged view of the manner in which the straw box is captured in the base.

FIGS. 18*a*-18*b* illustrate the manner in which the straw box 40 is held in the base 32. The base 32 is constructed with a step or shoulder 72 under which the top edge of the band 54 engages and cannot be easily removed without deforming the box 40. There is a shoulder 72 on two opposite sides of the box receptacle 56 formed in the base 32. The box 40 is easily deformed and removed from the shouldered receptacle 56 when empty of straws.

Figure 19A:
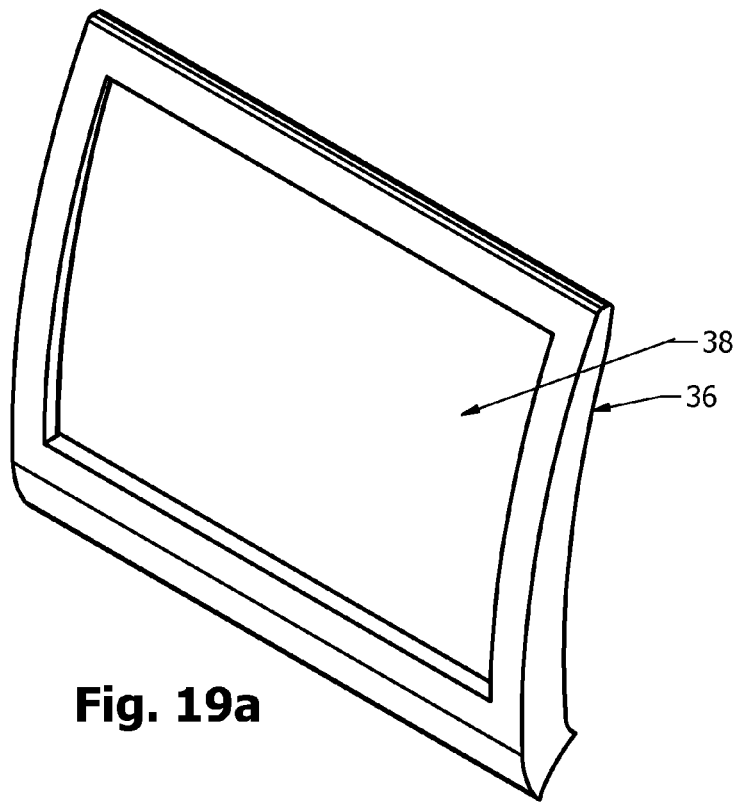
FIGS. 19a and 19b are isometric and side views illustrating the details of the advertisement base.
Figure 19B:
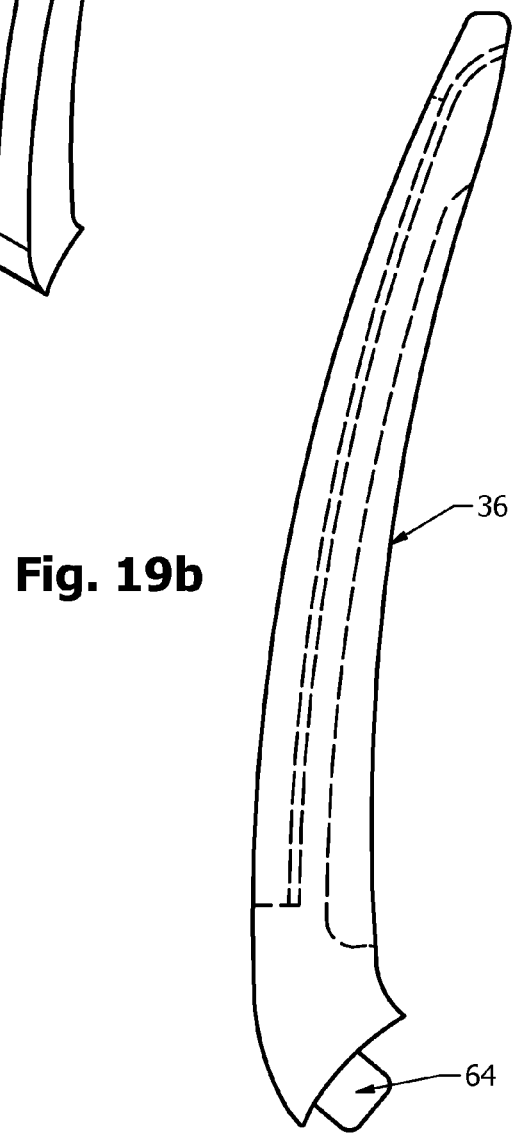

FIGS. 19*a* and 19*b* show the details of the optional advertisement display 36. As noted above, the tang 64 can be inserted into a slot of the base 32 and latched therein, and removed when desired. The window 38 is open to view a sheet advertisement that is inserted down into side slots formed on opposite back sides of the display 36. The entire advertisement display 36 can be constructed of an ABS type of plastic, or other suitable material. While the advertisement display 36 is curved, it could be constructed with many other shapes and sizes.

Figure 20A:
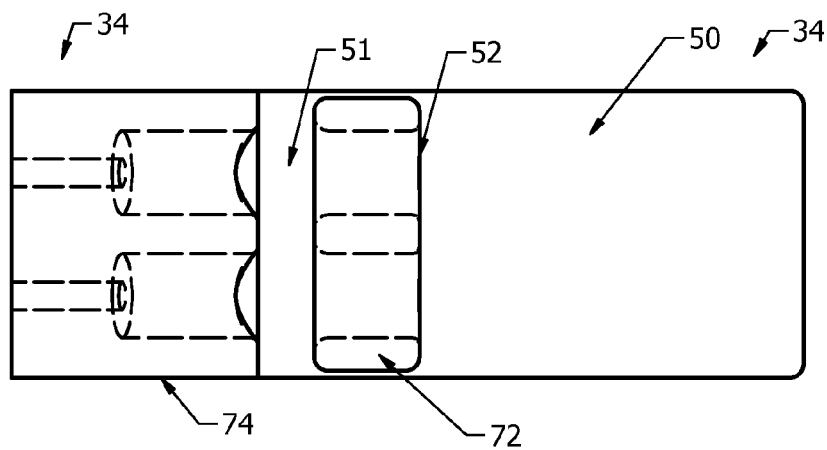
FIGS. 20a-20c illustrates the details of the wall bracket.
Figure 20C:
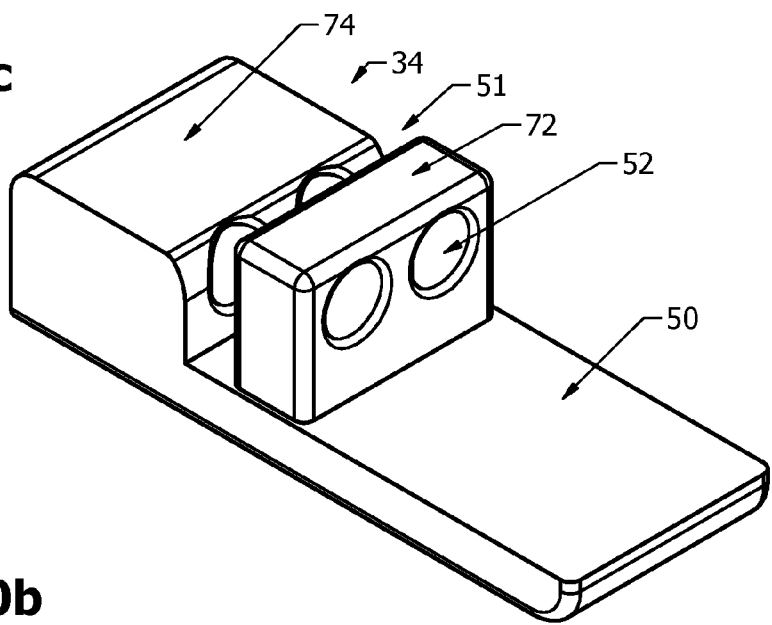
Figure 20B:
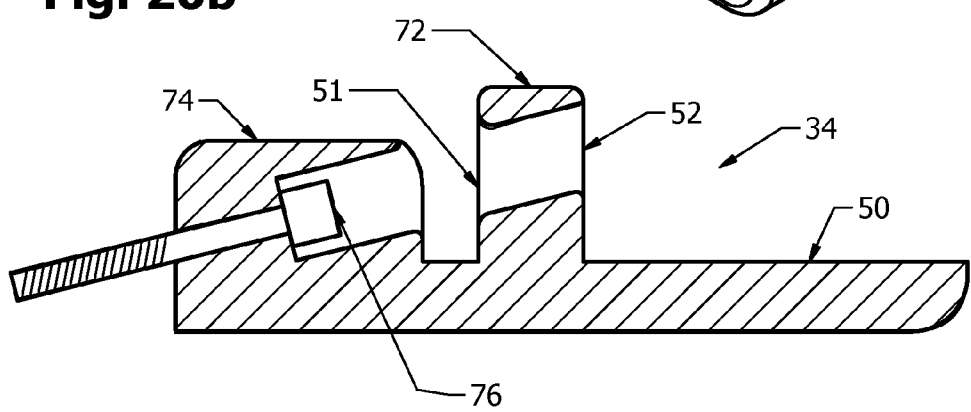

FIGS. 20*a*-20*c* illustrate the details of one wall stand 34. Two or more wall stands 34 can be used to support the straw dispenser 30 on a wall. The wall stand 34 is a one-piece molded plastic component constructed with the notch 51 formed between the upright members 72 and 74. The back panel of the dispenser base 32 can be inserted into the notch 51. As noted above, the platform 50 provides a support on which the weight of the straw dispenser 30 can rest during use. Two holes are formed in the wall stand 34, one shown as numeral 52. The hole 52 in the frontal member 72 is of a first diameter, which extends partially into the back member 74. The remainder of the hole in the back member 74 is smaller in diameter to allow an anchor screw 76, or the like, to be fastened to the wall or a wall stud.

Figure 7:
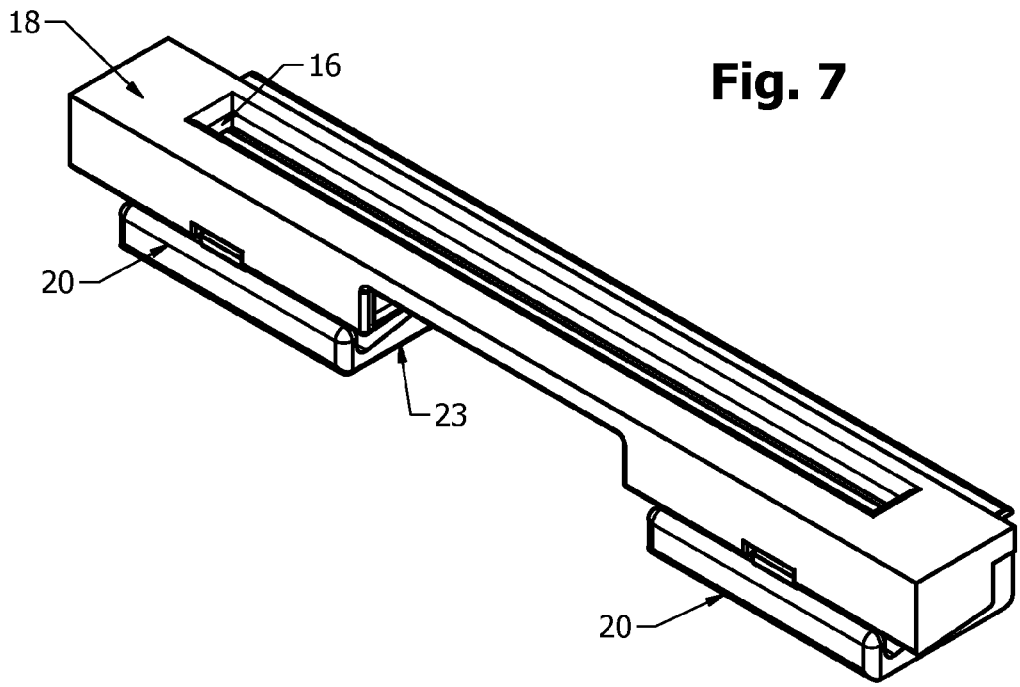
FIG. 7 is a top isometric view of the straw dispenser mechanism.
Figure 8:
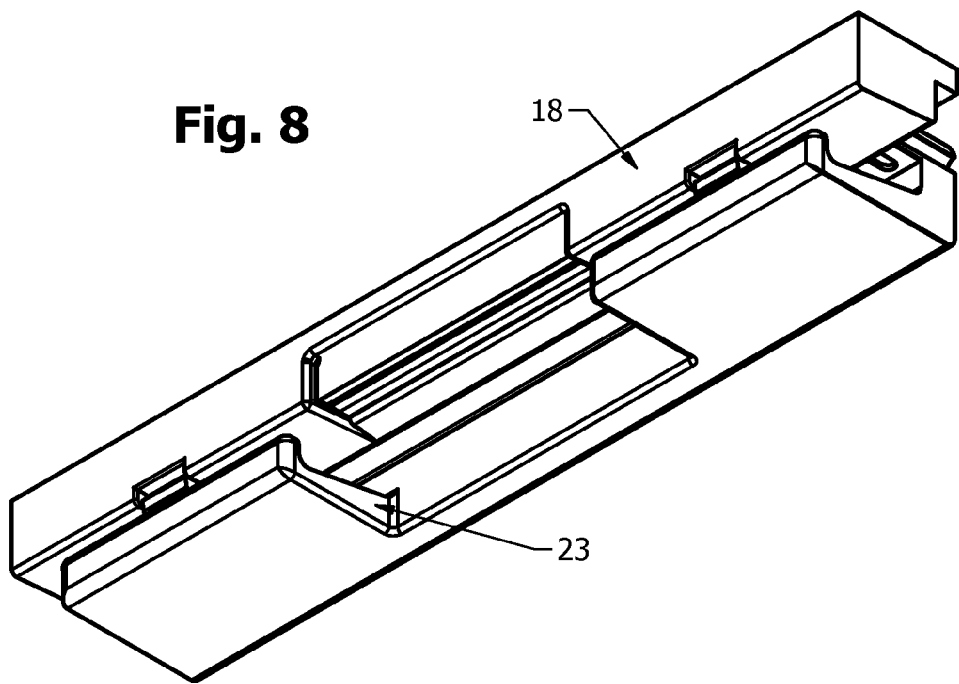
FIG. 8 is a bottom isometric view of the straw dispenser mechanism.
Figure 9:
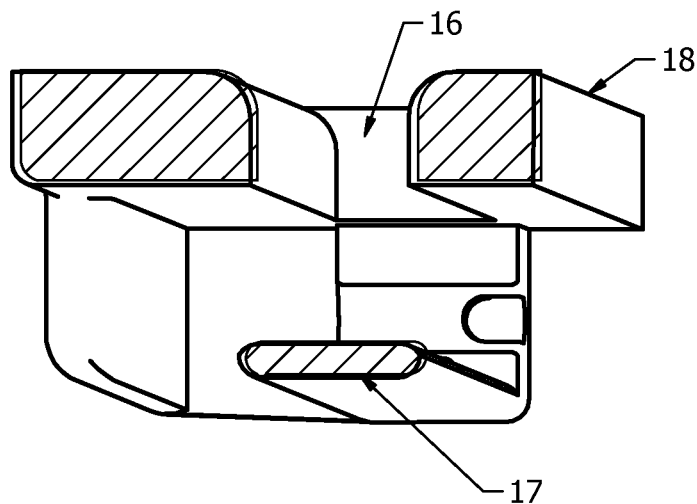
FIG. 9 is a cross-sectional view of the top stationary part of the straw dispenser mechanism.
Figure 21:
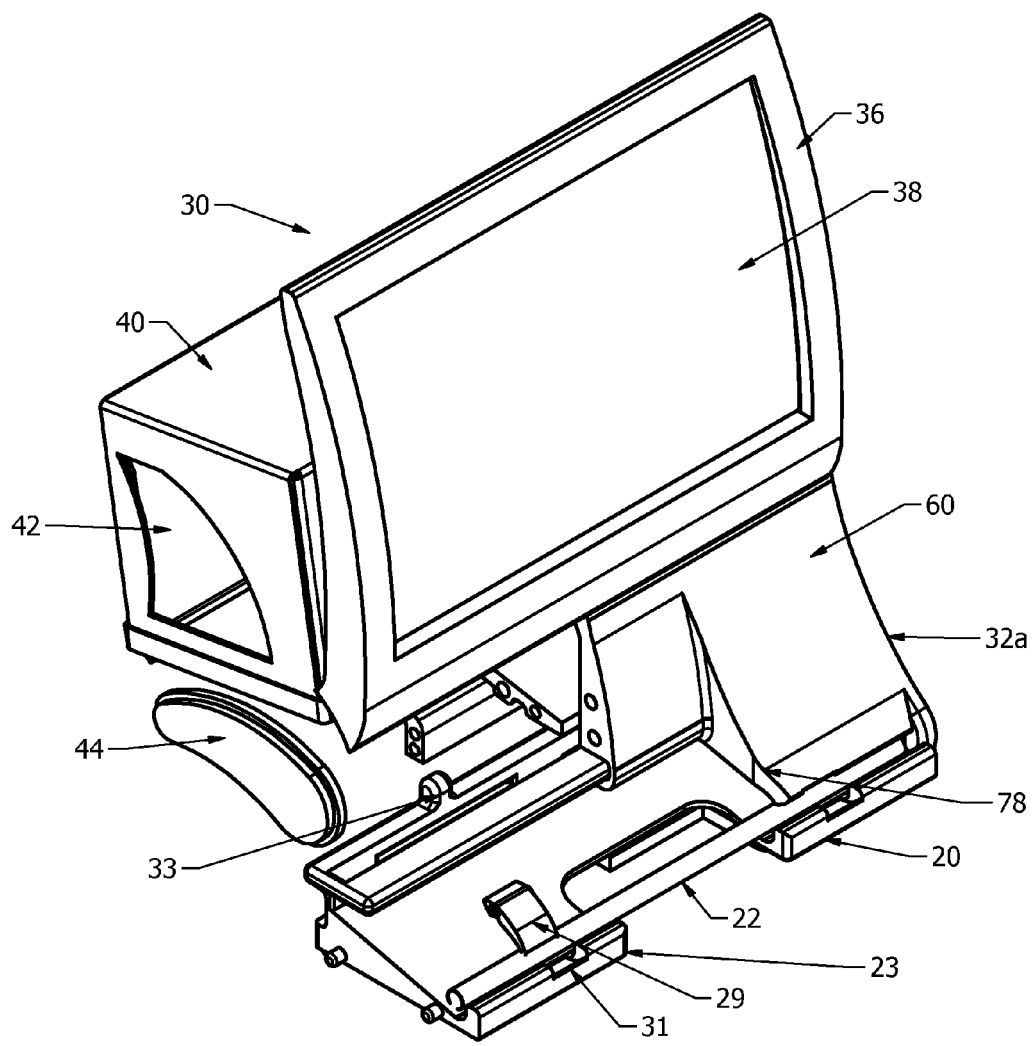
FIG. 21 is an isometric view of a portion of the soda straw dispenser mechanism.

FIG. 21 is a partial view of the straw dispenser 30, which includes a shroud or shield 78 that is extended outwardly to at least partially cover the top portion of the available straw 22 and not allow it to be lifted out of the lower slideable dispenser part 20 without pulling it forwardly. In order to grasp the available straw 22 that has rolled down the slanted landing 24, the lower slideable dispenser part 20 is formed with a cutout 23 so that a person can grasp the exposed midsection of the available straw 22 that is on the lower slideable dispenser part 20. The mid-section of the available straw 22 is exposed and thus available to the user on the frontal underside of the lower slideable dispenser part 20. The user can see the available straw 22 while standing in front of the dispenser 30, but must grasp the mid-section of the straw 22 from under lower slideable dispenser part 20. The top stationary part 18 can also be constructed with a cutout to facilitate the grasping of the available straw 22, as shown in FIGS. 4 and 7. The dispensing of a straw is the same as described above.

Figure 22A:
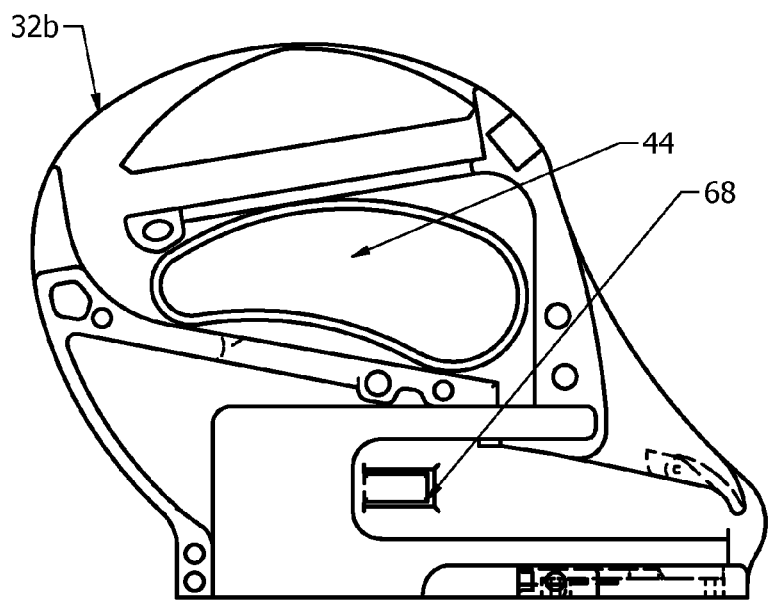
FIGS. 22a is a side view and 22b is a top view which illustrate the details of the latch for latching the straw selector/dispenser in the base of the soda straw dispenser mechanism.
Figure 22B:
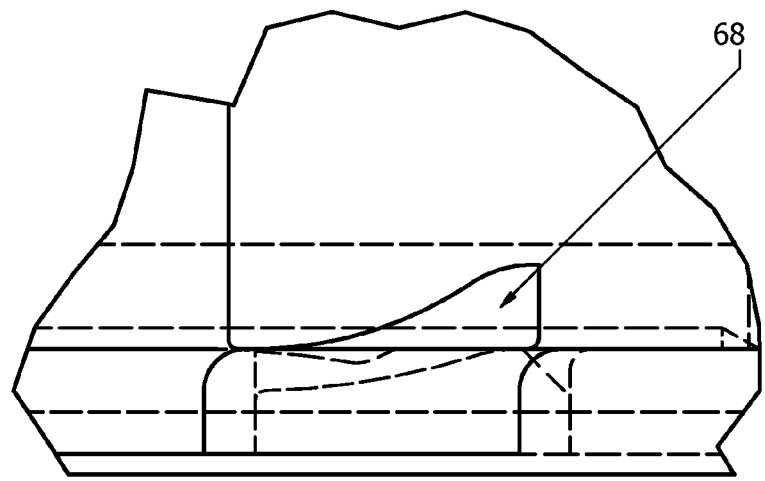

FIGS. 22*a* and 22*b* illustrate the latch 68 that captures the selector/dispenser 10 within the base 32 of the soda straw dispensers 10 or 30. Formed during the molding process of the base 32 are latch members, one shown as numeral 68. The latch members 68 protrude inwardly into the path of the selector/dispenser 10 when inserted into the frontal opening of the base 32. While not shown, the selector/dispenser 10 includes shoulders on opposite sides thereof, which press the latch members 68 outwardly during insertion of the selector/dispenser 10 into the base 32. Once the shoulders on the opposite sides of the selector/dispenser 10 move past the latch members 68, the latch members spring back and block backward movement of the selector/dispenser 10. The selector/dispenser 10 is thus latched into the base 32 and cannot be removed until the latch members 68 are manually pressed outwardly and out of the path of the selector/dispenser 10 so that it can be moved out of the base 32. The bottom panel of the base 32 is formed with a large opening in the bottom thereof so that the latch members 68 are accessible for manual manipulation.

From the description set forth above, disclosed is a soda straw dispenser structured to control individual straws so as to be selected from the inventory of straws, staged for dispensing, and finally made available to the user. The dispensing of the straws involves the user pulling the straw which moves a dispenser part that allows the staged straw to move to a transitory position, and on return of the movable dispenser part the next straw falls from the transitory position into the lower part of the dispenser. Another straw cannot be dispensed until the user removes the available straw from the movable dispenser part. As such, the users of the straw dispenser need not touch any part of the dispenser, only the straw that they dispense for their personal use. In addition, the straw dispenser is structured so that a box of straws can be attached to the dispenser without any of the straws being touched by the person filling the straw dispenser.

While the preferred another embodiments of the invention have been disclosed with reference to a specific soda straw dispenser and method of operation and manufacture thereof, it is to be understood that many changes in detail may be made as a matter of engineering choices without departing from the spirit and scope of the invention, as defined by the appended claims.

What is claimed is:

1. A straw dispenser mechanism, comprising:
    a top staging part and a lower slideable dispensing part;
    said top staging part having an elongate slot therein, and having a lateral stop member spaced from and underlying said elongate slot;
    said lower slideable dispensing part having an elongate slot therein, one portion of the elongate slot of the lower slideable dispensing part defined by a lateral separator member;
    a spring for biasing said lower slideable dispensing part to a home position in which the lateral separator member of said lower slideable dispensing part holds the straw in a transition position and prevents the straw in the elongate slot of the top staging part from falling downwardly; and
    said lower slideable dispensing part having an opening in which at least a portion of a straw to be dispensed is made available to a user for grasping, and when the straw is grasped and pulled, the lower slideable dispensing part moves forwardly to allow the straw to be taken by the user, and another straw is loaded from an inventory of straws and into the straw dispenser mechanism.

2. The straw dispenser mechanism of claim 1, wherein said lower slideable dispensing part is constructed to allow only a midsection portion of the straw to be made available for grasping by the user.

3. The straw dispenser mechanism of claim 1, further including a straw brake for preventing movement of said lower slideable part until the straw made available has been removed from the dispenser mechanism.

4. The straw dispenser mechanism of claim 1, wherein said straw dispenser mechanism is structured so that when said lower slideable dispensing part is moved forwardly, the straw in the staged position drops down into the transitory position in the slot of the lower slideable dispensing part, and is temporarily held in the transitory position by the lateral stop member of said top staging part.

5. The straw dispenser mechanism of claim 4, wherein said straw dispenser mechanism is structured so that when said straw drops to the transitory position, another straw is loaded from the inventory of straws in the slot of the top staging part in a staged position.

6. The straw dispenser mechanism of claim 5, wherein said straw dispenser mechanism is structured to hold a first straw in the staged position and at the same time hold a second straw in the transitory position and at the same time hold a third straw in the lower slideable dispensing part at a location where the third straw is made available to the user.

7. The straw dispenser mechanism of claim 5, wherein said lower movable part includes a slanted landing on which a straw drops from the transitory position and rolls forwardly to be made available to the user of the straw dispenser mechanism.

8. The straw dispenser mechanism of claim 7, wherein said straw dispenser mechanism is structured so that there can be only a single straw in the staged position, a single straw in the transitory position and a single straw dispensed from the transitory position onto the slanted landing.

9. The straw dispenser mechanism of claim 1, wherein the top staging part includes a top member having said slot therein and said lateral stop member is spaced from the top member, the space between the top member and said lateral stop member defining a channel, and wherein said lower slideable dispensing part includes a top member having said slot and said lateral separator member, and wherein said top member of said lower slideable dispensing part is adapted for forward and backward movement in the channel of said top staging part.

10. A straw dispenser mechanism, comprising:
a staging part of said mechanism having a stationary elongate slot and a stationary elongate stop spaced from and underlying said stationary elongate slot;
a movable dispensing part of said mechanism movable from a home position forwardly to a dispensing position, said movable dispensing part having an upper member that is movable between the stationary elongate slot and the underlying stationary elongate stop of said staging part, the upper member of said movable dispensing part having an elongate slot and an elongate separator member structured so that when said movable dispensing part is in the home position, the stationary elongate slot of said staging part and the elongate separator member of said movable dispensing part are vertically aligned so that a straw is captured in a staged position in the stationary elongate slot of said staging part and rests on the elongate separator member of said movable dispensing part; and
a straw brake for preventing movement of said movable dispensing part until the straw made available has been removed from the dispenser mechanism.

11. The straw dispenser mechanism of claim 10, wherein said mechanism is structured such that when said movable dispensing part is moved forwardly to a dispensing position, the elongate separator member of the movable dispensing part becomes vertically aligned with the stationary elongate slot of the staging part to thereby allow the straw staged in the staged position to move to a transitory position in which the straw is temporarily located in the elongate slot of said movable dispensing part and rests on the stationary elongate stop of said staging part.

12. The straw dispenser mechanism of claim 11, wherein said mechanism is structured such that when said movable dispensing part is moved from the dispensing position back to the home position, said straw located in the transitory position drops down onto a dispensing landing.

13. The straw dispenser mechanism of claim 12, wherein said mechanism is structured such that when said movable dispensing part is in the home position, a first straw is in the staged position, no straw is in the transitory position, and a second straw is on the dispensing landing.

14. The straw dispenser mechanism of claim 12, wherein said mechanism is structured such that when said movable dispensing part is in the dispensing position, a first straw is in the staging position, a second straw is in the transitory position, and a third straw is on the dispensing landing.

15. The straw dispenser mechanism of claim 12, wherein said mechanism is structured such that the transitory position of a straw is temporary and exists during the backward movement of the movable dispensing part to the home position.

16. The straw dispenser mechanism of claim 10, further including a box of straws removably attached to said straw dispenser mechanism, said box of straws of the type that allow straws to drop therefrom into the straw dispenser mechanism.

17. A method of dispensing straws, comprising:
storing a supply of straws in a straw dispenser;
holding a straw in an elongate slot of a top staging part of the straw dispenser, said straw held in the slot of the top staging part by a lateral stop member of a lower slideable dispensing part;
holding a straw in a temporary position as an individual straw in an elongate slot of the lower slideable dispensing part, said lateral stop member holds the straw in the temporary position in the elongate slot of the lower slidable dispensing part;
dropping the straw from the elongate slot of the lower slideable dispensing part from the temporary position onto a landing member during dispensing of a straw;
spring biasing said lower slideable dispensing part to a home position in which the lateral stop member of said lower slideable dispensing part holds the straw in the temporary position;
exposing a portion of the available straw to the user so that the straw can be pulled and retrieved by the user, and causing the pulling of the available straw to move a slideable dispensing part and allow the straw to be removed by the user from the straw dispenser;
when the straw is removed from the slideable dispensing part of said straw dispenser, retracting the slideable dispensing part to the home position to allow a subsequent straw to drop down onto the landing member and roll forward so that the portion thereof is exposed and available to another user; and
whereby straws can be dispensed by allowing users to touch only portions of the straws that are dispensed.

18. The method of claim 17, wherein said temporary position defines a transitory position, and further including holding the straw in a staged position at an elevation above said transitory position, and said transitory position exists only during movement of said slideable dispensing part.

19. The method of claim 18, further including moving a first straw from an inventory of straws to the staged position, holding a second straw in the transitory position during movement of said slideable dispensing part, and holding a third straw on said landing member.

20. The method of claim 17, further including dispensing straws one by one without a user touching anything but the required straw itself.

* * * * *